United States Patent
Iwata et al.

(10) Patent No.: US 7,802,282 B2
(45) Date of Patent: Sep. 21, 2010

(54) DETECTION OF COMMERCIALS IN A DIGITAL BROADCAST

(75) Inventors: Yasuaki Iwata, Kanagawa (JP); Sadatoshi Chozui, Osaka (JP)

(73) Assignee: Panasonic Corporation, Osaka (JP)

( * ) Notice: Subject to any disclaimer, the term of this patent is extended or adjusted under 35 U.S.C. 154(b) by 609 days.

(21) Appl. No.: 11/813,042

(22) PCT Filed: Jan. 11, 2006

(86) PCT No.: PCT/JP2006/300175

§ 371 (c)(1), (2), (4) Date: Jun. 28, 2007

(87) PCT Pub. No.: WO2006/075590

PCT Pub. Date: Jul. 20, 2006

(65) Prior Publication Data

US 2010/0031291 A1 Feb. 4, 2010

(30) Foreign Application Priority Data

Jan. 14, 2005 (JP) .............................. 2005-007382

(51) Int. Cl.
*G06F 3/00* (2006.01)
*G06Q 30/00* (2006.01)
*H04N 7/173* (2006.01)
*H04N 9/00* (2006.01)
*H04N 5/91* (2006.01)

(52) U.S. Cl. .............................. 725/42; 725/134; 386/1; 386/46; 705/14.4; 705/14.43

(58) Field of Classification Search .................. 725/42, 725/134; 386/1, 46; 705/14.4, 14.43
See application file for complete search history.

(56) References Cited

U.S. PATENT DOCUMENTS

| | | | | |
|---|---|---|---|---|
| 6,901,207 | B1 * | 5/2005 | Watkins | 386/83 |
| 6,993,245 | B1 * | 1/2006 | Harville | 386/46 |
| 2005/0193408 | A1 * | 9/2005 | Sull et al. | 725/32 |
| 2006/0029368 | A1 * | 2/2006 | Harville | 386/69 |
| 2006/0064716 | A1 * | 3/2006 | Sull et al. | 725/37 |

FOREIGN PATENT DOCUMENTS

| | | |
|---|---|---|
| JP | 05-250762 | 9/1993 |
| JP | 11-136634 | 5/1999 |
| JP | 2001-333406 A | 11/2001 |
| JP | 2002-218377 A | 8/2002 |
| JP | 2003-047031 A | 2/2003 |

OTHER PUBLICATIONS

International Search Report for Application No. PCT/JP2006/300175, dated Apr. 18, 2006.

* cited by examiner

*Primary Examiner*—Hoang-Vu A Nguyen-Ba
(74) *Attorney, Agent, or Firm*—RatnerPrestia

(57) ABSTRACT

A content detecting device for a digital broadcast signal receiver or a recording apparatus that records the digital broadcast signal. When information in program specific information and information in an electronic program guide information in the memory contradict each other concerning presence or absence of one of a closed captioning broadcast and a data broadcast, a detecting unit causes the memory to store information indicating the detection of the commercial.

23 Claims, 3 Drawing Sheets

DETECTION OF COMMERCIALS IN A DIGITAL BROADCAST

This Application is a U.S. National Phase Application of PCT International Application PCT/JP2006/300175.

TECHNICAL FIELD

The present invention relates to a content detecting device in a digital broadcast, and, more particularly to a commercial detecting device.

BACKGROUND ART

Television receivers and recorders having a commercial detecting function for distinguishing television programs and commercials (also called "commercial messages") are known.

Most of these apparatuses detect a commercial using a difference in audio states of a program and the commercial.

For example, Japanese Patent Unexamined Publication No. 5-250762 discloses the following.

Whereas sound used in a commercial is stereo sound, monophonic or multiplexed bilingual sound may be used in a program. In the document described above, the commercial is detected by detecting this difference in the sounds.

Japanese Patent Unexamined Publication No. 2003-47031 discloses the following.

A commercial is detected by detecting a silent state of sound at the time of switching of a program and the commercial. Japanese Patent Unexamined Publication No. 2003-47031 further discloses a method of judging whether a broadcast is a program and detecting a commercial by detecting an interval during which a silent state between the program and the commercial occurs.

Japanese Patent Unexamined Publication No. 11-136634 discloses the following.

In a program broadcasted with a movie as a material, a signal converted from the movie into a television signal, i.e., a signal of a telecine video and a normal television signal are discriminated. Consequently, a commercial created by the normal television signal and the program are distinguished.

DISCLOSURE OF THE INVENTION

A content detecting device for a receiver that receives and decodes a digital broadcast signal or a recording apparatus that records the digital broadcast signal of the invention is constituted and operates as described below.

A program-related-information acquiring unit acquires program specific information, which is information for decoding the digital broadcast signal, and electronic program guide information, which is information for creating an electronic program guide, included in a multiple stream of the digital broadcast signal from the multiple stream.

A memory stores the program specific information and the electronic program guide information acquired by the program-related-information acquiring unit.

A detecting unit detects a commercial included in the digital broadcast signal based on information on presence or absence of one of a closed captioning broadcast and a data broadcast from the program specific information read out from the memory, outputs detection information indicating the detection of the commercial, and causes the memory to store the detection information.

A discriminating unit reads out the detection information from the memory, discriminates the detection of the commercial, and outputs a signal for distinguishing a program and the commercial.

In this content detecting device, when the detecting unit detects that information in the program specific information and information in the electronic program guide information read out from the memory indicate contrary contents concerning presence or absence of one of the closed captioning broadcast and the data broadcast, the detecting unit causes the memory to store detection information indicating the detection of the commercial.

DESCRIPTION OF REFERENCE NUMERALS AND SIGNS

Figure 1:
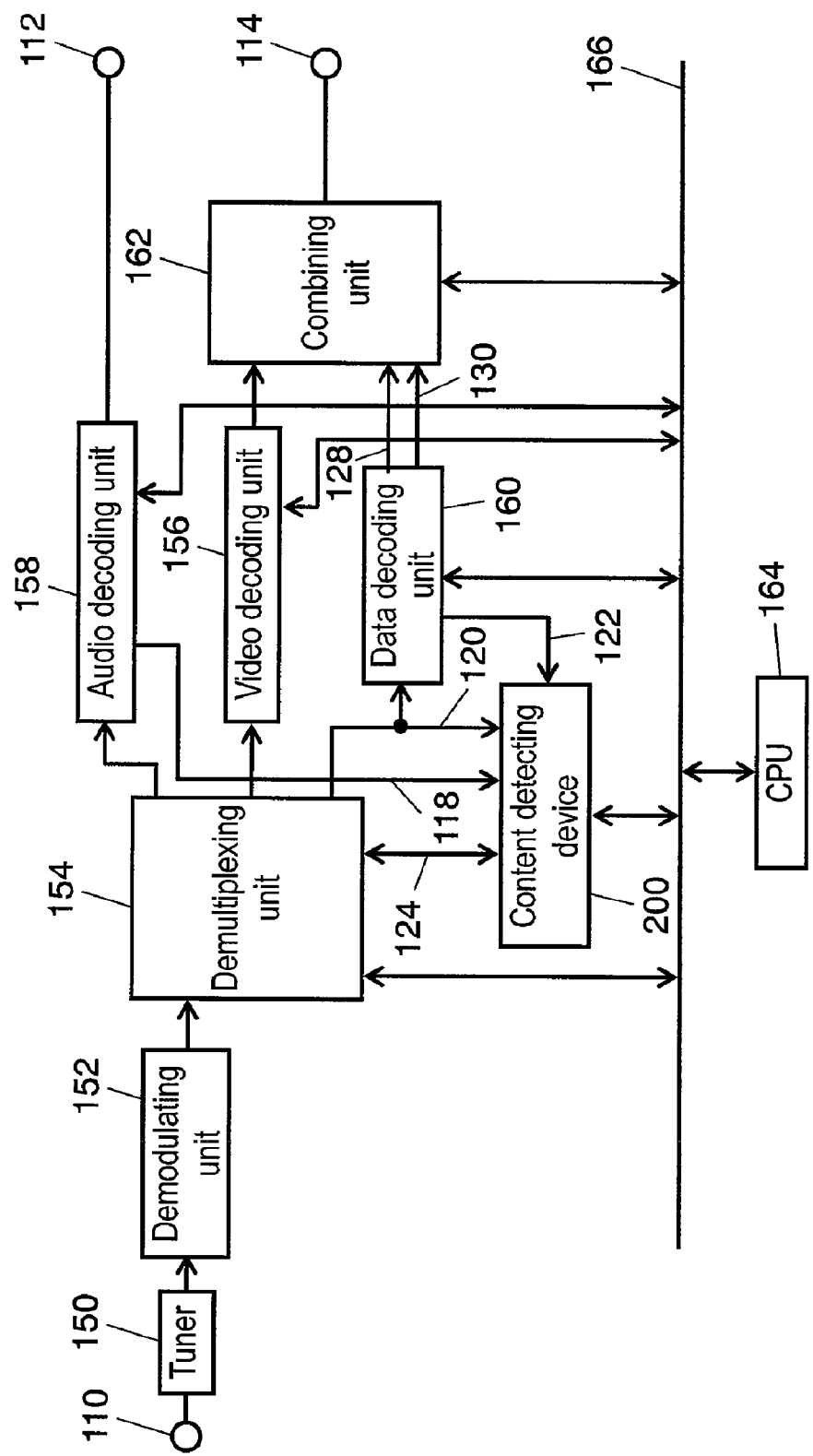
FIG. 1 is a functional block diagram showing a structure of a digital broadcast receiver including a content detecting device in an embodiment of the invention.

110 Digital broadcast signal input
112 Audio output
114 Video output
118 Audio multiplex related data
120 Data broadcast stream
122 Data related information
124 Data line
128 Display screen data
130 EPG display screen data
150 Tuner
152 Demodulating unit
154 Demultiplexing unit
156 Video decoding unit
158 Audio decoding unit
160 Data decoding unit
162 Combining unit
164 CPU
166 Bus line
200 Content detecting device
201 Program-related-information acquiring unit
210 Data-broadcast-information acquiring unit
203 Memory
204 Electronic program guide/audio multiple signal discriminating unit (EPG/AMX discriminating unit)
206 Detecting unit
207 Discriminating unit
208 Timer
212 Discrimination signal output

DETAILED DESCRIPTION OF THE PREFERRED EMBODIMENTS

An embodiment of the invention will be hereinafter explained using the drawings.

FIG. 1 is a functional block diagram showing a structure of a digital television (digital TV) broadcast receiver including a content detecting device of this embodiment.

In FIG. 1, CPU 164 performs control of respective units of the entire receiver. A received digital broadcast signal is inputted to digital broadcast signal input 110. Tuner 150 performs selection of a channel of the inputted signal according to control data indicating a selection channel from CPU 164. A digital TV broadcast signal of the channel selected is inputted to demodulating unit 152.

Demodulating unit 152 digitally demodulates the received signal and outputs multiple data stream (a transport stream (TS)) as digital data including the selection channel.

Demultiplexing unit 154 separates a packet of the selected channel from the TS inputted in accordance with a standard of MPEG2 (Moving Picture Expert Group 2) into packets of video data, audio data, and data for data broadcast of the channel and outputs data stream of the respective packets. The TS includes program specific information (PSI), which is information for decoding a digital broadcast signal, time information, and the like. Demultiplexing unit 154 extracts these kinds of information and sends the information to CPU 164 as control information. CPU 164 sends control data for controlling separation to demultiplexing unit 154.

The TS also includes service information (SI). Information such as a channel name of a service and titles, start and end times, duration, contents, and progress states of respective programs is included in the SI. It is possible to create a display screen of an electronic program guide (EPG) as a program list and display the display screen on a screen by processing the SI.

Demultiplexing unit 154 also separates packets of the PSI and the SI from the TS.

Video decoding unit 156 decodes the video data of the video stream separated by the demultiplexing unit 154 and outputs a video signal to video output 114.

Audio decoding unit 158 decodes the encoded audio data of the audio data stream and outputs a decoded audio signal to audio output 112. Audio decoding unit 158 operates based on the control data from CPU 164. Audio decoding unit 158 identifies data of a header and the like in the audio data and sends data indicating information such as audio format to CPU 164.

Data decoding unit 160 processes data of data stream for data broadcast 120, forms a display screen for a data broadcast, and outputs display screen data 128 indicating the display screen to combining unit 162. Further, data decoding unit 160 processes inputted SI data, forms a display screen for an EPG, and outputs EPG display screen data 130 indicating the display screen for an EPG to combining unit 162.

Combining unit 162 combines or selects the display screen for a video signal and a data broadcast and the EPG display screen based on the control data from CPU 164.

As described above, CPU 164 controls operations of tuner 150, demodulating unit 152, demultiplexing unit 154, video decoding unit 156, audio decoding unit 158, data decoding unit 160, and combining unit 162 via bus line 166.

Content detecting device 200 in the embodiment of the invention is connected to demultiplexing unit 154, audio decoding unit 158, and data decoding unit 160. Content detecting device 200 may be connected to CPU 164 and controlled by CPU 164. Content detecting device 200 may exchange information for operations thereof with control CPU 164. Content detecting device 200 may be controlled by another CPU not shown in the figure.

Figure 2:
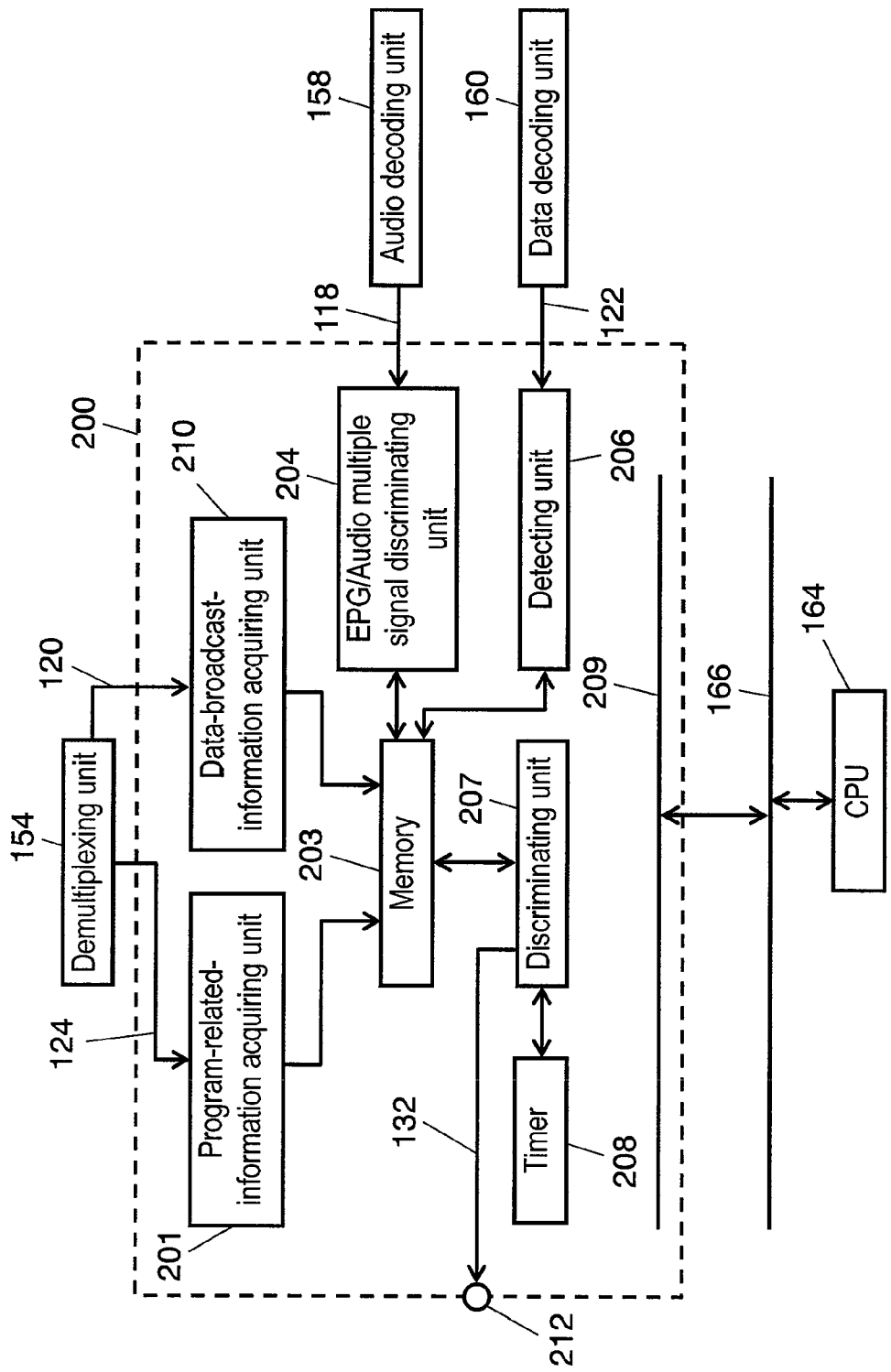
FIG. 2 is a functional block diagram showing a structure of the content detecting device in the embodiment of the invention.

FIG. 2 is a functional block diagram for explaining operations of content detecting device 200 in the embodiment of the invention.

Program-related-information acquiring unit 201 is connected to a TS data line of demultiplexing unit 154 via data line 124 and acquires program specific information (PSI), which is information for decoding a digital broadcast signal, and service information (SI), which is information for creating an electronic program guide, from the TS. Program-related-information acquiring unit 201 may acquire the PSI and the SI separated by demultiplexing unit 154 via data line 124.

Data-broadcast-information acquiring unit 210 acquires a download information indication (DII), which is information indicating a structure of data forming a data broadcast, and a download data block (DDB), which is information including data forming a data broadcast, from data stream for data broadcast 120 separated in demultiplexing unit 154. The DII and the DBB are included in the data stream for data broadcast. The DII is periodically inserted in a stream of blocks of a plurality of the DDBs forming a data carousel.

Memory 203 stores data acquired by data-broadcast-information acquiring unit 210 and program-related-information acquiring unit 201.

Detecting unit 206 detects specific contents, in particular, a commercial included in a digital broadcast signal based on any one of the data stored in memory 203, audio multiplex related data 118 inputted from audio decoding unit 158, and data related information 122 inputted from data decoding unit 160 or a combination thereof. Detecting unit 206 causes memory 203 to store detection information indicating the detection of the commercial.

Electronic program guide (EPG)/audio multiple signal (AMX) discriminating unit 204 is connected to memory 203. EPG/AMX discriminating unit 204 receives audio multiplex related data 118 from audio decoding unit 158. EPG/AMX discriminating unit 204 judges, based on audio multiplex related data 118 and the information of the PSI stored in memory 203, that the commercial is decoded.

Discriminating unit 207 reads out the detection information stored in memory 203, discriminates that the commercial is detected, and outputs discrimination signal 132 for distinguishing a program and the commercial to discrimination signal output 212.

CPU 164 is connected to data-broadcast-information acquiring unit 210, program-related-information acquiring unit 201, memory 203, detecting unit 206, EPG/AMX discriminating unit 204, and discriminating unit 207 via bus line 209 and controls these units.

Timer 208 is connected to discriminating unit 207 and controls a discrimination time of discriminating unit 207.

The respective units of detecting device 200 may be controlled by another CPU not shown in the figure. Moreover, the respective units of detecting device 200 may have control functions independently or operations of all the units may be realized by software.

The functions of content detecting device 200 in FIG. 2 may be included in data decoding unit 160. Further, for example, demultiplexing unit 154, audio decoding unit 158, video decoding unit 156, data decoding unit 160, content detecting device 200, and the other units may be constituted by one hardware block such as one large scale integrated circuit (LSI).

Operations of data-broadcast-information acquiring unit 210 and program-related-information acquiring unit 201 will be further explained.

Data-broadcast-information acquiring unit 210 acquires information of a DDB and a DII of data broadcast data. The DDB is a block of data of a data broadcast, forms a data carousel, and is periodically transmitted repeatedly. Data-broadcast-information acquiring unit 210 acquires a return-to_entry_flag in the DII, other information on the data carousel, and the like in synchronization with local content switching of entry components in the data carousel. Those kinds of information are stored in memory 203. The return-to_entry_flag in the DII will be described later.

Program-related-information acquiring unit 201 acquires information described below. Information such as an event information table (EIT) and a selection information table (SIT) included in SI and a program map table (PMT) included in PSI is acquired. The EIT is information on a program such as a program name, a broadcast date and time, and broadcast contents. The PMT is information on a video, sound, data and the like forming one channel. The SIT is information on a service, an event, and a stream of a TS obtained by extracting a part of streams from the TS in which plural channels are included.

The tables such as the PMT and the EIT are transmitted with data such as descriptors included therein, respectively. Program-related-information acquiring unit 201 acquires, in particular, in descriptors describing information on a data broadcast, a data content descriptor and the like in the EIT and data_component_id, auto_Start_flag and the like, which are data encoding system descriptors arranged in an entry component (component_tag=0×40) in the PMT.

In this embodiment, descriptors describing information on subtitles and sound, which are included in the EIT and the PMT, are particularly important information. Information that program-related-information acquiring unit 201 should acquire is descriptors of information on monophonic/stereo, plural languages and the like, and subtitles, and the like such as a component descriptor, an audio component descriptor, and a data content descriptor included in the EIT. Those kinds of information are acquired by program-related-information acquiring unit 201 and stored in memory 203.

Memory 203 may be a storage device in control CPU 164. Memory 203 may be included in another memory in the receiver.

Detection based on an audio multiple signal will be hereinafter explained.

Audio multiplex related data 118 is data indicating a state of sound of a sound multiplex broadcast identified by audio decoding unit 158. Program-related-information acquiring unit 201 acquires SI, obtains information on an EPG, and causes memory 203 to store the information. EPG/AMX discriminating unit 204 reads out, from memory 203, information on audio multiplexing of the information on the EPG acquired. EPG/AMX discriminating unit 204 discriminates whether a state of sound at that time is monophonic or stereo or sound for a bilingual broadcast (or sound for a multilingual broadcast) based on the information read out. Moreover, when the these states of sound indicated by audio multiplex related data 118 inputted are different from a state of sound informed by the EPG at that time, EPG/AMX discriminating unit 204 judges that a commercial of a sound state different from sound information of the program is decoded at that time.

In this case, EPG/AMX discriminating unit 204 judges that decoded contents are a commercial and sets a flag indicating that the commercial is detected, for example, CMflag_A in an address determined in advance in memory 203 as detection information for a period of the judgment.

Detection based on information on a data broadcast will be explained.

A case in which detecting unit 206 discriminates a commercial by acquiring a descriptor describing information on a data broadcast from information of an EIT of SI, a PMT of PSI, and the like will be explained.

In many cases, an EPG does not include information on a commercial. In other words, the SI often does change according to presence or absence of a commercial. On the other hand, the PSI often includes information that changes according to presence or absence of a commercial.

For example, when detecting unit 206 detects a description indicating that a data broadcast is present in a program according to a data broadcast descriptor, which is a descriptor of the EIT of the SI, detecting unit 206 can judge that a data broadcast service is performed in the program. Moreover, when there is no description of a data broadcast in a data broadcast related descriptor in the PMT of the PSI, detecting unit 206 judges that a commercial is broadcasted.

Conversely, when there is no description concerning a data broadcast in the EIT of the SI and there is a description concerning a data broadcast in the PMT of the PSI, detecting unit 206 also judges that a data broadcast service for a commercial is broadcasted.

In other words, when the PMT of the PSI, which is information for decoding a digital broadcast signal, and the EIT of the SI, which is information for forming the EPG, include contrary information concerning information on a data broadcast, it is possible to detect that a commercial is broadcasted in that period.

When detecting unit 206 detects contrary information concerning presence or absence of a closed captioning broadcast or a data broadcast in each of program specific information and electronic program guide information read out from the memory 203, detecting unit 206 causes memory 203 to store detection information indicating the detection of the commercial.

Detecting unit 206 judges that the commercial is broadcasted in the period and sets a flag indicating that the commercial is detected, for example, CMflag_D in a predetermined address in memory 203 in that period.

Detection according to information on subtitles will be explained.

A case in which detecting unit 206 discriminates a commercial by acquiring a descriptor describing information on subtitles from information of an EIT of SI, a PMT of PSI, and the like will be explained. The subtitles are also classified into a data broadcast in a broad sense. However, the subtitles are distinguished from the data broadcast and explained.

When there is a description indicating presence of subtitles in a description concerning a program of the EIT and there is no description of subtitles in the PMT, detecting unit 206 judges that a commercial is broadcasted in the period.

Detecting unit 206 judges the commercial is broadcasted in that period and sets a flag indicating that the commercial is detected, for example, CMflag_D in a predetermined address in memory 203 in that period.

As described above, in the case of detection based on information on a data broadcast or information on subtitles, detecting unit 206 causes memory 203 to store information indicating the detection of the commercial as described below.

Detecting unit 206 detects contrary information concerning presence or absence of a closed captioning broadcast and a data broadcast in each of program specific information, which is information for decoding a digital broadcast signal read out from memory 203, and electronic program guide information for creating an electronic program guide. In that case, detecting unit 206 causes memory 203 to store detection information indicating the detection of the commercial.

Detection based on information on contents of a data broadcast will be explained.

In a case described below, it is possible to judge that a commercial is broadcasted. It is detected that a data broadcast is present according to a descriptor concerning the data broadcast, for example, a data content descriptor of an EIT in SI or a data system encoding descriptor of a PMT in PSI.

Moreover, a description of download information indication (DII), which is information indicating a structure of data forming the data broadcast, indicates that a data carousel is empty, i.e., there is no data of a download data block (DDB), which is information including data forming the data broadcast.

Detecting unit 206 judges a period in which is it possible to judge that the commercial is broadcasted is a period in which the commercial is broadcasted and sets a flag indicating that the commercial is detected, for example, CMflag_D in a predetermined address in memory 203 in that period.

As explained above, program-related-information acquiring unit 201 acquires a descriptor concerning the data broadcast and causes memory 203 to store the descriptor. Data-broadcast-information acquiring unit 210 acquires a DII and causes memory 203 to store the DII.

Detection based on switching of data for a data broadcast will be explained.

A case in which a commercial is detected based on detection of switching of data for a data broadcast and information on a data broadcast and an EPG will be explained.

As types of a data broadcast service, there are an associated data broadcast provided in association with a television program and an audio program and an independent data broadcast in which a broadcast service is performed with data as a main object. Therefore, data for the data broadcast includes associated data and non-associated data as described below.

Associated data is data for the associated data broadcast and is additional data with contents for supplementing a video and sound. In a data broadcast of a digital broadcast, a screen involving some graphics display such as a menu screen is automatically displayed after start of the receiver using the associated data.

The non-associated data is data for the independent data broadcast and is often used for the independent data broadcast with contents dependent from a video and sound.

On the other hand, an auto_Start_flag included in a data encoding system descriptor of a PMT starts a function of decoding a data broadcast of the receiver. When the auto_Start_flag is "1", a service by the associated data is started simultaneously with selection of a channel of a television broadcast. The non-associated data is started when the data broadcast is selected by a user.

In many cases, a broadcasting station sets the auto_Start_flag as "1" and transmits a data broadcast for displaying, with the non-associated data, data contents of a screen at the start of the receiver (at the startup time) over an entire screen of a television video. The screen at the startup time is called a "TOP screen". The screen of the data broadcast for displaying data contents over an entire screen as a television video is called a "transparent data screen".

In many cases, when a screen at the start of the receiver is the transparent data screen and the user presses a data start button, a menu screen and the like are presented.

When auto_Start_flag is "1" and the associated data is transmitted, at the start of the receiver (at the startup time), an image involving some graphic display such as a menu screen is displayed on the "TOP screen".

When a commercial is transmitted, the transparent screen of the non-associated data may be switched to the associated data. Data decoding unit 160 analyzes content data (DDB) of the data broadcast and creates a data broadcast display screen. For that purpose, data decoding unit 160 recognizes contents of the data broadcast screen when data decoding unit 160 analyzes data of the DDB. Data decoding unit 160 can recognize that the data of the DDB is contents as "transparent screen data" and whether the data is associated data or non-associated data. Therefore, data decoding unit 160 can input information indicating that data contents of the TOP screen are non-associated data or associated data to detecting unit 206 as data related information 122.

Therefore, detecting unit 206 can detect that the non-associated transparent screen is switched to the screen of the associated data.

In many cases, a commercial is broadcasted by switching a state of non-associated data to associated data in the "transparent screen data".

Detecting unit 206 can discriminate from contents of a data content identifier of an EIT of SI whether an original data broadcast is formed by non-associated data or associated data.

Program-related-information acquiring unit 201 acquires the data content identifier of the EIT and causes memory 203 to store the data content identifier in a predetermined address. When detecting unit 206 recognizes that data contents of the TOP screen is switched from non-associated data to associated data, detecting unit 206 looks at the data content identifier of the EIT stored in the memory 203. In this case, when the EIT indicates that a data broadcast is non-associated, detecting unit 206 judges that a commercial is started.

It is also possible that non-associated data is switched to associate data to broadcast a commercial. Data decoding unit 160 can input data related information 122 indicating switching from non-associated data to associated data of the data of the DDB to detecting unit 206. Therefore, in this case, detecting unit 206 also looks at the data content identifier of the EIT stored in memory 203. When the EIT indicates that the original data broadcast is associated, detecting unit 206 judges that a commercial is started.

Thereafter, when information on association or non-association of the data broadcast indicated by the EIT and association or non-association of contents of the data broadcast coincide with each other, detecting unit 206 judges that the commercial is finished. Memory 203 records the start and the finish of the commercial.

Update of data contents is performed in a boundary of the commercial and the program.

Contents of the commercial may be forcibly presented using a return_to_entry_flag of a DII. The return_to_entry_flag has a function of, when a value thereof is "1", returning any screen of the data broadcast to a screen at the startup time. Therefore, this function can be used at the start and the finish of the commercial.

Information on the update of the data contents is inputted to detecting unit 206 from data decoding unit 160.

When the return_to_entry_flag of the DII is "1", data-broadcast-information acquiring unit 210 causes memory 203 to store data indicating that the return_to_entry flag of the DII is set.

Therefore, detecting unit 206 can more surely perform detection of a commercial in combination with judgment according to information on update of data, information on the return_to_entry_flag, and association and non-association of the contents of the data broadcast described above.

This means that at least one of the information on the update of the data content and the information on the return_to_entry_flag may be added to conditions for judgment of at least one of the start of the commercial and the finish of the commercial.

Detecting unit 206 sets a flag CMflag_D indicating that the commercial is detected in a predetermined address of the memory in a period from a point when the start of the commercial is detected until a point when the finish of the commercial is detected.

Judgment according to plural conditions will be explained.

Discriminating unit 207 can distinguish a program and a commercial by looking at a flag indicating commercial detection such as CMflag_D stored in memory 203.

CMflag_A indicating commercial detection based on an audio multiple signal and CMflag_D indicating commercial detection based on information on a data broadcast and subtitles, detection based on information on contents of the data broadcast, or commercial detection based on switching of the data broadcast are flags different from one another. For example, it is assumed that, when a commercial is detected, both the flags are "1" and, when a commercial is not detected, both the flags are "0".

It is assumed that "A" or "B" indicates that each of CMflag_A and CMflag_D is "1" or "0". Discriminating unit 207 calculates a logical expression of "A" AND "B" that uses a logical AND and "A" OR "B" that uses a logical OR and determines that a case in which a result of the calculation is "1" is a commercial period. This makes it possible to change conditions for commercial detection. Therefore, it is possible to change accuracy and frequency of commercial detection. When "A" AND "B" is used, commercial detection is performed more surely. When "A" OR "B" is used, commercial detection is performed more frequently.

As described above, discriminating unit 207 may discriminate a commercial based on a logical AND or a logical OR of detection information indicating detection of a commercial and further information indicating detection of a commercial.

Judgment by a timer will be explained.

Figure 3:
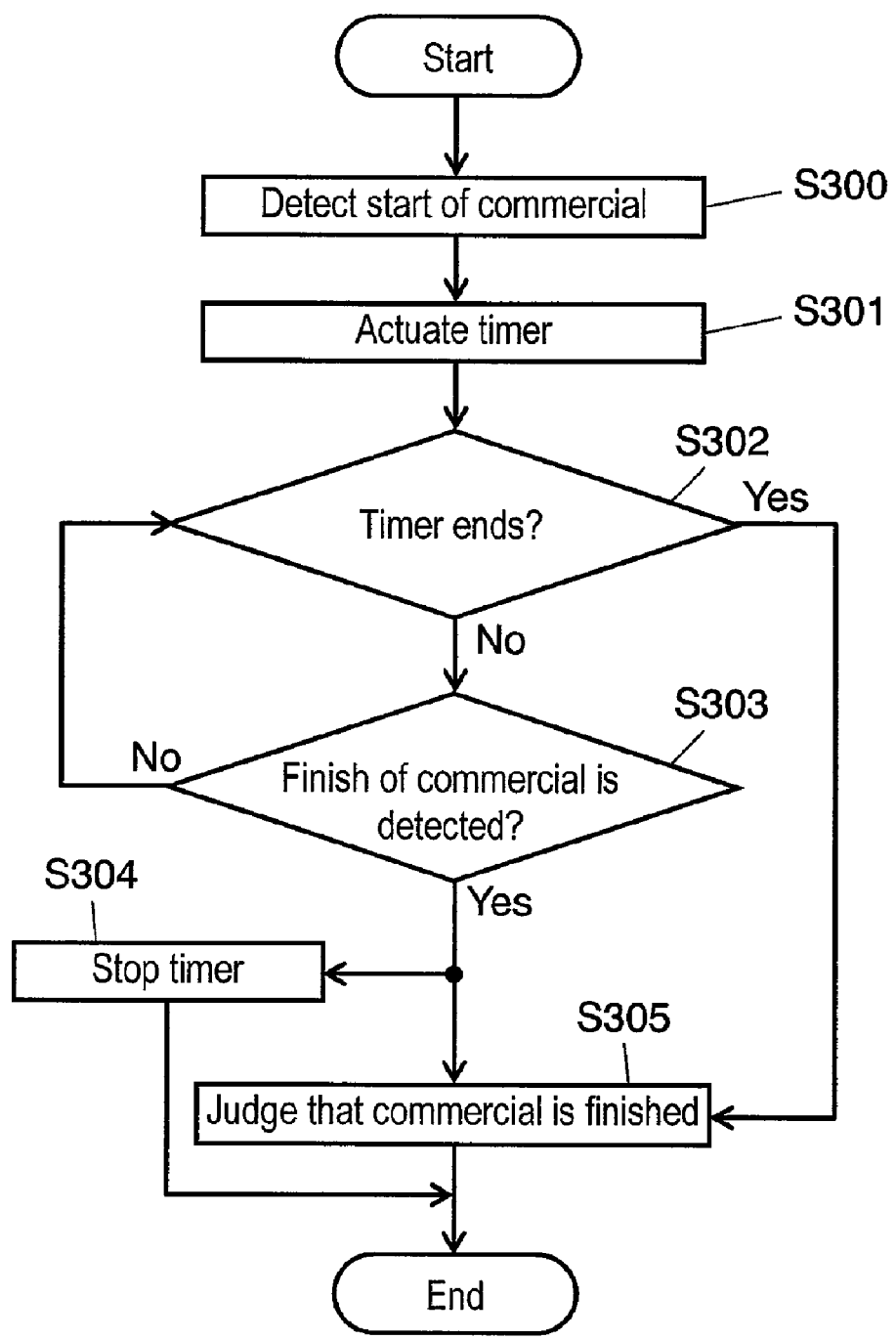
FIG. 3 is a flowchart for explaining a timer operation in the embodiment of the invention.

In FIG. 3, after a predetermined time from the start of a commercial, discriminating unit 207 itself performs judgment that the commercial is finished using time information from timer 208.

In step S300, discriminating unit 207 judges that a commercial is started.

In step S301, discriminating unit 207 actuates timer 208.

In step S302, discriminating unit 207 judges whether the predetermined time from the start of the commercial set in timer 208 has elapsed. When the predetermined time has elapsed (Yes), discriminating unit 207 shifts to step S305 and judges that the commercial is finished. When the predetermined time has not elapsed (No) in step S302, discriminating unit 207 shifts to step S303.

In step S303, discriminating unit 207 checks whether a flag indicating that a commercial is broadcasted is set in memory 203. When a flag indicating that a commercial is broadcasted is not set in memory 203 (Yes), discriminating unit 207 shifts to step S304 and S305. When a flag indicating that a commercial is broadcasted is set in memory 203 (No), discriminating unit 207 returns to step S302 and timer 208 continues to operate.

In step S304, discriminating unit 207 stops timer 208.

In step S305, discriminating unit 207 judges that the commercial is finished and outputs signal 132 indicating the finish of the commercial to output unit 212. Alternatively, discriminating unit 207 stops output of a signal indicating that the commercial is broadcasted.

Since the predetermined time is set in timer 208, it is automatically judged that the commercial is finished after the predetermined time set. For example, in the case of a television broadcast in Japan, a large number of commercials for a time of about fifteen seconds and thirty seconds are broadcasted. Therefore, time of the timer may be set to fifteen seconds or time longer than fifteen seconds and not longer than thirty seconds.

In the case of mobile reception of a digital broadcast, it is also assumed that, in particular, during commercial detection, the receiver moves to an environment in which reception is impossible. Since the timer function described above is added to detecting device 110, even if the finish of the commercial cannot be detected, detecting device 110 can forcible cause the receiver to recognize the finish of the commercial.

An example of detection according to a transport stream transmitted from the receiver to the recorder will be explained.

An example of commercial detection in a BLU-RAY disk recorder, a D-VHS (Digital VHS) recorder, a hard disk recorder, and the like that receive and record a transport stream transmitted from a receiver will be explained.

In the case of these recorders, the transport stream received from the receiver includes a selection information table (SIT), which is a table not included in a transport stream of a signal broadcasted from a broadcasting station. The SIT is generated from an EIT or the like by the receiver. The SIT includes a service, a stream, and an event, i.e., information on a program included in the transport stream received from the receiver. The SIT is information included in service information (SI), which is information for creating an electronic program guide.

Therefore, in these recorders, commercial detection may be performed based on the SIT instead of the EIT in the explanations in each of the detection based on information on a data broadcast, the detection according to information on subtitles, the detection based on information on contents of the data broadcast, and the detection based on switching of data for the data broadcast described above.

In the above explanation, the digital television broadcast system standardized by the Association of Radio Industries and Businesses (ARIB)) and implemented in Japan is explained. However, in the DVB (Digital Video Broadcasting) system, the ATSC (Advanced Television Standard Committee) system, and other digital broadcast system adopted in other countries and regions, it is likely that commercial detection can be performed by a method same as or similar to the comparison of a PMT of PSI and an EIT of SI explained above.

Here, (1) what is equivalent to the PMT is information on a video, sound, and data forming one channel. (2) What is equivalent to the EIT or the SIT is information on a data broadcast included in information for forming the EPG.

In other words, in the same manner as the commercial detection explained above, it is likely that it can be judged that a commercial is broadcasted when the information of (1) and the information of (2) are compared and contrary information is detected concerning presence of one of a closed captioning broadcast and a data broadcast in the information.

In other broadcast systems, when information on a data broadcast, for example, the information of (2) indicates presence of data, it is likely that a commercial can be detected even when information equivalent to the DII indicating contents of the data broadcast indicates that contents of the data broadcast are empty.

INDUSTRIAL APPLICABILITY

The detecting device of the invention provides functions useful for a digital television broadcast receiver and a digital television signal recorder. In the digital television broadcast receiver, commercial detection is accurately performed by this detecting device. The digital television signal recorder can use a detection signal by this detecting device for performing commercial cut and distinguishing a program and a commercial as menus and saving the program and the commercial in a recording medium.

The invention claimed is:

1. A content detecting device for a receiver that receives and decodes a digital broadcast signal or a recording apparatus that records the digital broadcast signal, comprising:
a program-related-information acquiring unit for acquiring program specific information, which is information for decoding the digital broadcast signal, and electronic program guide information, which is information for creating an electronic program guide, included in a multiple stream of the digital broadcast signal;
a memory that stores the program specific information and the electronic program guide information acquired by the program-related-information acquiring unit;
a detecting unit that detects a commercial included in the digital broadcast signal, the detecting unit outputs detection information indicating detection of the commercial, and causes the memory to store the detection information when based on a comparison:
a) one of the program specific information and electronic program guide information indicates the presence of one of a closed captioning broadcast and a data broadcast, and
b) another of the program specific information and electronic program guide information indicates the absence of one of a closed captioning broadcast and a data broadcast; and
a discriminating unit that reads out the detection information from the memory, discriminates the detection of the commercial, and outputs a signal for distinguishing a program and the commercial, wherein
when there is a descriptor indicating the presence of one of the closed captioning broadcast and the data broadcast in the program specific information, and there is not a descriptor indicating the presence of the one of the closed captioning broadcast and the data broadcast in the electronic program guide information, the detector detects the commercial.

2. The content detecting device of claim 1, further comprising a data-broadcast-information acquiring unit that acquires information on a data broadcast and causes the memory to store the information, wherein
when the detecting unit detects that there is no content of the data broadcast in information on the data broadcast acquired by the data-broadcast-information acquiring unit and detects information indicating presence of the data broadcast in the electronic program guide information, the detecting unit causes the memory to store detection information indicating the detection of the commercial.

3. The content detecting device of claim 2, wherein
the information on the data broadcast is a description included in a download information indication, which is information indicating a structure of data forming the data broadcast, and
the information indicating presence of the data broadcast in the electronic program guide information is an event information table, which is information on programs.

4. The content detecting device of claim 3, further comprising a timer in which a predetermined time is set, wherein
the discriminating unit judges that the commercial is finished after the predetermined time elapsed from the detection of the commercial.

5. The content detecting device of claim 2, wherein
the information on the data broadcast is a description included in a download information indication, which is information indicating a structure of data forming the data broadcast, and
the information indicating presence of the data broadcast in the electronic program guide information is selection information table, which is information on programs, and is used for the recording apparatus.

6. The content detecting device of claim 5, further comprising a timer in which a predetermined time is set, wherein
the discriminating unit judges that the commercial is finished after the predetermined time elapsed from the detection of the commercial.

7. The content detecting device of claim 2, further comprising a timer in which a predetermined time is set, wherein
the discriminating unit judges that the commercial is finished after the predetermined time elapsed from the detection of the commercial.

8. The content detecting device of claim 1, wherein
when the detecting unit receives, from the receiver, information indicating that data for a data broadcast on a screen at start of the receiver is changed from associated data for a program of the digital broadcast to non-associated data for the program or the data for a data broadcast is switched from the non-associated data to the associated data and
detects information indicating contradiction to the associated data or the non-associated data after the switching in the electronic program guide information concerning whether the data for a data broadcast is the associated data or the non-associated data, the detecting unit causes the memory to store information indicating start of the commercial, and
when the detecting unit detects information indicating coincidence with information indicated by the data for a data broadcast in the electronic program guide information concerning whether the data for a data broadcast is the associated data or the non-associated data, the detecting unit causes the memory to store information indicating that the detection of the commercial is stopped.

9. The content detecting device of claim 8, wherein the detecting unit further causes the memory to store, as information on update of the data for a data broadcast, at least one of the information indicating start of the commercial and the information indicating that the detection of the commercial is stopped.

10. The content detecting device of claim 9, further comprising a timer in which a predetermined time is set, wherein
the discriminating unit judges that the commercial is finished after the predetermined time elapsed from the detection of the commercial.

11. The content detecting device of claim 8, wherein the detecting unit further causes the memory to store, as detection of information on return to a startup screen for the data broadcast, at least one of the information indicating start of the commercial and the information indicating that the detection of the commercial is stopped.

12. The content detecting device of claim 11, further comprising a timer in which a predetermined time is set, wherein
the discriminating unit judges that the commercial is finished after the predetermined time elapsed from the detection of the commercial.

13. The content detecting device of claim 8, further comprising a timer in which a predetermined time is set, wherein
the discriminating unit judges that the commercial is finished after the predetermined time elapsed from the detection of the commercial.

14. The content detecting device of claim 1, wherein the information on presence or absence of one of the closed captioning broadcast and the data broadcast is a program map table, which is information on components included in one channel in the program specific information, and is an event information table, which is information on programs in the electronic program guide information.

15. The content detecting device of claim 14, further comprising a timer in which a predetermined time is set, wherein
the discriminating unit judges that the commercial is finished after the predetermined time elapsed from the detection of the commercial.

16. The content detecting device of claim 1, further comprising an electronic program guide/audio multiplex discriminating unit that receives audio multiplex related data indicating that a state of sound of the digital broadcast signal is any one of monophonic, stereo, and multilingual, wherein
when a state of the sound indicated by the electronic program guide information and a state of the sound indicated by the audio multiplex related data are different, the electronic program guide/audio multiple signal discriminating unit causes the memory to store further detection information indicating the detection of the commercial.

17. The content detecting device of claim 16, wherein the discriminating unit discriminates a commercial based on a logical AND or a logical OR of the detection information indicating the detection of the commercial and the further detection information indicating the detection of the commercial.

18. The content detecting device of claim 17, further comprising a timer in which a predetermined time is set, wherein
the discriminating unit judges that the commercial is finished after the predetermined time elapsed from the detection of the commercial.

19. The content detecting device of claim 16, further comprising a timer in which a predetermined time is set, wherein
the discriminating unit judges that the commercial is finished after the predetermined time elapsed from the detection of the commercial.

20. The content detecting device of claim 1, wherein the information on presence or absence of one of the closed captioning broadcast and the data broadcast is a program map table, which is information on components included in one channel in the program specific information, and selection information table, which is information on programs in the electronic program guide information, and is used for the recording apparatus.

21. The content detecting device of claim 20, further comprising a timer in which a predetermined time is set, wherein
the discriminating unit judges that the commercial is finished after the predetermined time elapsed from the detection of the commercial.

22. The content detecting device of claim 1, further comprising a timer in which a predetermined time is set, wherein
the discriminating unit judges that the commercial is finished after the predetermined time elapsed from the detection of the commercial.

23. The content detecting device of claim 22, wherein the predetermined time is equal to or longer than fifteen seconds and equal to or shorter than thirty seconds.

* * * * *